United States Patent [19]

Parrish et al.

[11] Patent Number: 5,047,372

[45] Date of Patent: Sep. 10, 1991

[54] ALLOYED POWDER AND METHOD OF PREPARING SAME

[75] Inventors: Lien Parrish, Cross Lanes, W. Va.; Lionel C. Montgomery, Bay Village, Ohio

[73] Assignee: Ucar Carbon Technology Corporation, Danbury, Conn.

[21] Appl. No.: 291,605

[22] Filed: Dec. 29, 1988

[51] Int. Cl.$^5$ .................. C04B 35/56; C04B 35/58
[52] U.S. Cl. ...................... 501/87; 501/88; 501/92; 501/96
[58] Field of Search ............... 501/87, 88, 96, 92

[56] References Cited

U.S. PATENT DOCUMENTS

| | | | |
|---|---|---|---|
| 2,906,605 | 9/1959 | Dubeck | 423/297 |
| 2,973,247 | 2/1961 | Espenscheid | 423/297 |
| 3,004,830 | 10/1961 | Orne . | |
| 3,013,862 | 12/1961 | May . | |
| 3,246,956 | 4/1966 | Wood et al. . | |
| 3,328,127 | 6/1967 | Byrns . | |
| 3,351,428 | 11/1967 | Titus et al. | 264/345 |
| 3,536,793 | 10/1970 | Norman et al. | 501/87 |
| 4,492,764 | 1/1985 | Watanabe et al. | 501/96 |
| 4,534,835 | 8/1985 | DeAngelis | 501/96 |
| 4,540,475 | 9/1985 | DeAngelis | 501/98 |
| 4,546,089 | 10/1985 | Wusirika | 501/96 |
| 4,605,633 | 8/1986 | DeAngelis | 501/96 |
| 4,605,634 | 8/1986 | DeAngelis | 501/96 |
| 4,636,481 | 1/1987 | Kido et al. | 501/96 |
| 4,678,760 | 7/1987 | Ray | 501/98 |
| 4,693,989 | 9/1987 | Sane | 501/96 |

FOREIGN PATENT DOCUMENTS 49-024900  3/1974  Japan ................. 501/87

Primary Examiner—William R. Dixon, Jr.
Assistant Examiner—Anthony J. Green
Attorney, Agent, or Firm—E. Lieberstein

[57] ABSTRACT

A powder comprising an alloy of a refractory material and carbothermic reaction product produced by carbothermically reacting a blend of at least two metal oxides.

11 Claims, 2 Drawing Sheets

ALLOYED POWDER AND METHOD OF PREPARING SAME

FIELD OF THE INVENTION

The present invention relates to powders which are hot-pressed or sintered to form refractory bodies.

BACKGROUND OF THE INVENTION

Certain refractory powders, used to form refractory shapes by compressing the powders at an elevated temperature, can be produced by reaction of metal oxides with carbon to form carbides, or borides if a boron source is also added. Such processes are disclosed in, for example U.S. Pat. Nos. 3,351,428, 2,906,605, 2,973,247, 3,004,830, 3,013,862, 3,246,956, and 3,328,127.

For some applications, an alloyed refractory shape is desired, e.g. a shape of titanium boride and chromium diboride. Typically these alloyed refractory shapes are formed by blending different powders together, with a powder for each component, and then hot-pressing the blended mixture. A problem with these processes, is that, even with extensive blending, the uniform distribution of the different powders is difficult to achieve. In addition, each powder must be prepared separately, which results in a substantial increase in the number of process steps required to form the refractory shape.

In addition to blended powders for alloys, mixed powder compositions are often produced to introduce sintering aids, and other process aids, into the powders. Certain refractory powders, such as those of titanium diboride and boron carbide, cannot be hot-pressed or sintered in their pure form to form a product of sufficient density and strength. In order to form suitably dense and strong refractory shapes from these powders, a small amount of sintering aid is required. For example, titanium diboride powders used commercially usually contain iron, nickel, and/or cobalt, which act as sintering aids. Generally, these sintering aids are introduced into the powder by ball milling the powders with stainless-steel or tungsten carbide balls (which generally contain 6 to 12 wt. % cobalt) through attrition of the balls. Alternately, sintering aids, such as the above metals, nickel diboride, or chromium diboride, can be added to the refractory powder and the mixture blended before hot-pressing of the powder. A problem with these methods, is that it is difficult to obtain a uniform distribution of the sintering aid in the powder. In addition, in methods which rely upon attrition of the milling balls to add the sintering aid, it is difficult to control the amount of sintering aid added to the powder.

OBJECTS OF THE INVENTION

It is, therefore, an object of the invention to provide alloyed powders of refractory materials and a process for producing such powders, wherein the components are substantially uniformly distributed.

It is also an object of the invention to provide a process for producing alloyed powders which requires fewer process steps than in prior art processes.

It is also an object of the invention to produce a truly alloyed powder of two or more components, rather than a mechanical mixture of different powders such that the components do not segregate or become non-uniformly distributed when mixed.

It is further an object of the invention to provide a process for producing powders of refractory materials containing a controlled amount of an additive, such as a sintering aids.

Additional objects of the invention will become evident in the description that follows.

SUMMARY OF THE INVENTION

An embodiment of the present invention is a method for preparing an alloyed powder of carbothermic reaction products of metal oxides and carbon, which method comprises:

(a) blending (1) carbon, (2) at least one first metal oxide which forms a refractory compound in a carbothermic reaction, and (3) at least one second metal oxide which forms a reaction product in a carbothermic reaction to form a reaction mixture;

(b) heating the reaction mixture from step (a) to a temperature sufficient to form an alloy of the refractory compound and the reaction product; and (c) comminuting the alloy of step (b) to form an alloy powder.

Another embodiment of the invention is a powder comprising a refractory compound which is a carbothermic reaction product and at least one reaction product which is a carbothermic reaction product different from the refractory compound, wherein the refractory compound and the reaction product are intimately alloyed together in individual powder particles.

Carbothermic reactions are reactions with metal oxides and carbon at elevated temperatures to form a reduction product of the metal oxide.

The first metal oxide, which can be one metal oxide or a combination of metal oxides, forms a refractory compound in a carbothermic reaction. Refractory compounds formed by the carbothermic reaction of the first metal oxide include boron carbide, silicon carbide and the carbides and borides of transition metals, such as, for example, carbides and borides of titanium, zirconium, chromium, molybdenum, tungsten (wolfram), niobium, tantalum, iron nickel, cobalt, vanadium, niobium, hafnium, silicon, uranium, and thorium. Refractory compounds of most commercial interest are silicon carbide, boron carbide, and the carbides and borides of tungsten (wolfram), zirconium, chromium, and titanium. Representative carbothermic reactions forming refractory compounds include, for example;

$$WO_3 + 4C \rightarrow WC + 3CO,$$

$$2B_2O_3 + 7C \rightarrow B_4C + 6CO,$$

$$TiO_2 + B_2O_3 + 5C \rightarrow TiB_2 + 5CO,$$

$$TiO_2 + 3C \rightarrow TiC + 2CO,$$

$$Cr_2O_3 + 2B_2O_3 + 9C \rightarrow 2CrB_2 + 9CO,$$

$$ZrO_2 + B_2O_3 + 5C \rightarrow ZrB_2 + 5CO,$$

$$SiO_2 + 3C \rightarrow SiC + 2CO.$$

The carbothermic reaction product of the second metal oxide is different from the first metal oxide and can be any of the refractory reaction products discussed above as well as other carbothermic reaction products, such as those which are additives to improve the properties of the final ceramic shape. These include, for example, grain growth inhibitors, such as chromium diboride ($CrB_2$), and various sintering aids, such as, for example, borides of iron, nickel, and cobalt. The iron, nickel, or cobalt boride reaction products can, for example, be produced by the reaction of carbon with the corresponding oxide compounds, e.g. $Fe_2O_3$, $NiO$, $CoO$, and $Co_2O_3$, in the presence of a boron source. Other sintering aids which can be produced as the reaction product of the second metal oxide are, for example, $ZrC$, $B_4C$, nickel phosphite ($Ni(H_2PO_2)_2$), $SiB_4$, and $SiB_6$.

The carbon source in the method of the invention includes any finely divided form of carbon used for formation of refractory materials by carbothermic reaction, such as carbon sources currently used in $TiB_2$ production. Suitable forms of carbon include carbon black, lampblack, and other similar forms of carbon. A suitable carbon black is available under the Trademark "Thermax," from Thermatomic Carbon Co., Division of Commercial Solvents Co., Sterlington, LA.

The first metal oxide, the second metal oxide and carbon are blended or mixed together by any suitable solid-solid mixing method. Suitable methods of blending include the use of tumblers, Vee-blenders, vertical screw blenders, and the like.

The particle size of the first and second metal oxides, and carbon reactants is not critical, although the reactants should be sufficiently fine to allow intimate mixture to assist in the carbothermic reaction. Suitable average particle sizes for the reactants are 325 Tyler mesh (0.44 mm) and less.

For the formation of borides, any suitable boron source is added to the reaction mixture, such as boron or a boron oxide. Preferably the boron source is $B_2O_3$.

The amounts of the first and second metal oxides, and the carbon used in the reaction mixture are determined by the desired composition of the final product. In general the final product can be determined by application of known principles. Typically the nature of the final product is dependent upon the amount of carbon reactant, and the thermodynamic stability of the final product. For example, in a reaction to form $TiB_2$ from carbon, $TiO_2$, and $B_2O_3$, if more than a stoichiometric amount of carbon is present, and $B_2O_3$ is not in excess, the product is predominately a mixture of $TiB_2$ and $TiC$. If an excess of $B_2O_3$ is used, and a stoichiometric amount of the carbon is used, essentially only $TiB_2$ is formed, since $TiB_2$ is more thermally stable than $TiC$. Other considerations in choosing the amount of reactants are material handling, material vapor pressure, stability at reaction temperature and residence time. As a specific example, in a reaction mixture of $TiO_2$, $B_2O_3$, $SiO_2$, and C, to form $TiB_2$ and $SiC$, the reactants in stoichiometric excess are usually $B_2O_3$, and $SiO_2$. For another example, in a reaction mixture of $TiO_2$, $B_2O_3$, $Fe_2O_3$, and C, to form $TiB_2$, with FeB sintering aid, $B_2O_3$, $Fe_2O_3$ are usually in a stoichiometric excess.

After blending the first metal oxide, the second metal oxide, and the carbon to form the reaction mixture, the reaction mixture is heated to induce a carbothermic reaction. The reaction conditions are generally the same as those known in the art to produce the pure products by the carbothermic reaction of oxides. Generally this requires a temperature between 1600° C. and 2000° C. in a nonoxidizing atmosphere.

The reaction product is then comminuted to form a powder, such as by conventional milling methods, e.g. micromilling, ball milling, and attrition milling. Generally, for powders used in the production of hot-pressed refractory articles, an average particle size less than 20 microns, preferably about 5 microns or less, is suitable.

The powders produced by the method of the invention may be used to form sintered shapes. Typically the powders are formed into shapes by a sintering or hot-pressing technique. Generally the temperature and pressure conditions typically used to form hot-pressed shapes from mixed powders are suitable. In the case where the alloyed powders include a sintering agent, the temperature of the hot-pressing can be somewhat less than in the prior art powders with blended sintering aid. Because the powders of the invention are a true alloy, the sintering aid is more evenly dispersed and its effect in promoting sintering is thereby improved. Therefore, by practice of the invention, preformed ceramic shapes can be sintered or hot-pressed at lower tempera This in turn leads to a long mold life and the tendency toward grain growth in the ceramic shape during sintering is reduced. The reduced grain growth results in finer-grained shapes which have improved toughness.

By practice of the invention the amount of additive, such as a sintering aid, may be more exactly controlled. In addition, since the sintering aid is more effectively dispersed, thus increasing the effect of the sintering aid, the amount of sintering aid required is less than in prior art methods. Typically, when the reaction product of the second metal oxide is a the sintering aid, it is present in an amount of from 0.1 wt. % to about 3 wt. %.

DESCRIPTION OF THE INVENTION

The invention will now be illustrated by examples.

EXAMPLE I

This example illustrates production of an alloyed powder according to the invention comprising approximately 88 weight percent WC, and 12 weight percent Co. A blend of metal oxides and carbon is prepared by mixing 716.8 g $WO_3$, 112.4 g $Co_3O_4$, and 170.8 g carbon (Thermax) in a V-blender for 60 minutes. The blended material is pressed at room temperature and a pressure of 12,000 psi to form plugs in the form of rectangular solids dimensioned 0.5 inches $\times$ 0.5 inches $\times$ 1.0 inch. Each plug weighs approximately 5 g with a density of about 1.22 g/cm$^3$. The plugs are placed into a graphite capsule with an inside diameter of about 3.5 inches, and about 12 inches long. The capsules containing the plugs are placed into a 4 inch inside diameter resistance heated furnace. After purging the furnace with argon for one hour, the power to the furnace is turned on, and the capsule is heated at a rate of 300° C./hour to a temperature of 1800° C. The carbothermic reaction is carried out at 1800° C. for one hour while the argon flow rate is maintained at 4 ft$^3$/hr. The power to the furnace is then turned off, and the capsule allowed to cool. After cooling, the reaction product is removed from the capsule, weighed, and micromilled to a particle size less than 65 mesh. If the carbon and the metal oxides in the plugs are fully converted, the reaction product weighs 694 g or less.

Figure 1:
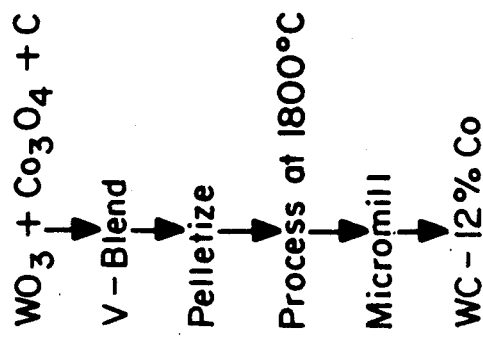
FIG. 1 is a flow-chart illustrating a method of the invention for forming an alloyed powder of WC and cobalt.

In FIG. 1 is summarized the above-described process for production of WC and Co alloyed powders.

EXAMPLE II

Figure 2:
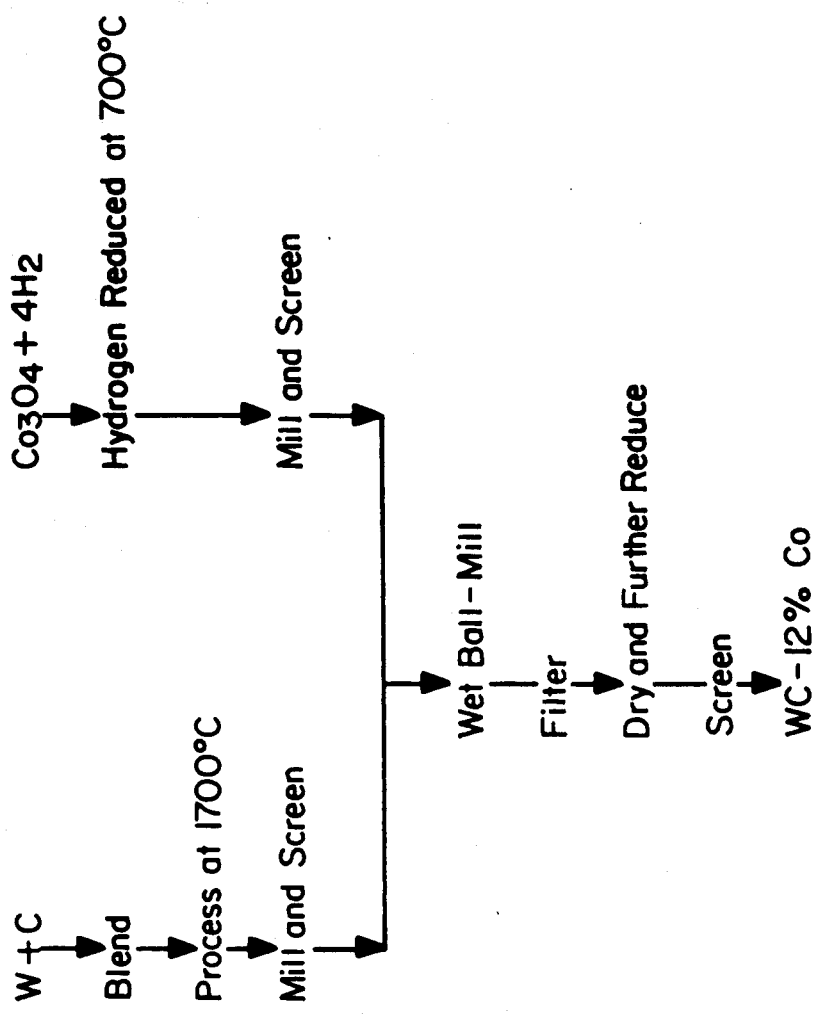
FIG. 2 is a flow-chart illustrating a prior method for forming a mixed powder of WC and cobalt.

This is a comparative example showing a prior art method for producing blended powders. Referring to FIG. 2, which is a flow chart which illustrates the method commonly used in commercial practice for producing a mixed blend of WC and Co powders. As shown by the flow chart, WC powder is first produced by mixing and reacting tungsten and carbon, and milling the reaction product to form a $WC_2$ powder. Separately Co powder is formed by reducing $Co_3O_4$ in hydrogen at 700° C., and milling the product to form Co powder. The WC, and Co powders are then blended together in a ball mill, filtered, dried, and screened to form a mixed powder of WC and Co.

The contrasts with the present invention. Referring to FIG. 1, which summarizes the method of the invention described above in Example I, raw materials for producing WC powder, and Co powders are mixed together in one reaction mixture, namely $WO_3$ $Co_3O_4$, and carbon. This reaction mixture is reacted, and then milled to form an alloyed powder of WC and Co.

A major advantage of the present invention, as illustrated by the flow diagrams in FIGS. 1 and 2, is that the method of the invention requires less than half the process steps of the prior art method, resulting in significant savings in production time and costs. Since the prior art method require separate production of two different powders, the capital and labor costs for the prior art method is significantly higher than that of the invention, which requires only one reaction step.

An additional advantage is that the powder of the invention is a true alloy of WC and Co, rather than a mechanical mixture. As such the powder of the invention is not subject to separation and segregation of the powder components, and has a more uniform distribution of the components.

EXAMPLE III

This example illustrates production of an alloyed powder according to the invention comprising approximately 70 wt. % SiC and 30 wt. % $TiB_2$. A blend of metal oxides and carbon is prepared by mixing 1049.1 g $SiO_2$, 345 g $TiO_2$, 331 g $B_2O_3$, and 887.4 g carbon (Thermax) in a v-blender for 60 minutes. The blended material is pressed at room temperature and a pressure of 12000 psi to form plugs in the form of rectangular solids 0.5 inch × 0.5 inch × 1.0 inch. Each plug weighs approximately 5 g with a density of about 1.22 g/cm$^3$ The plugs are placed into a graphite capsule with an inside diameter of about 3.5 inches, and about 12 inches long. The capsules containing the plugs are placed into a 4 inch inside diameter resistance heated furnace. After purging the furnace with argon for one hour, the power to the furnace is turned on, and the capsule is heated at a rate of 300° C./hour to a temperature of 1800° C. The carbothermic reaction is carried out at 1800° C. for one hour while the argon flow rate is maintained at 4 ft$^3$/hr. The power to the furnace is then turned off, and the capsule allowed to cool. After cooling, the reaction product is removed from the capsule, weighed, and micromilled to a particle size less than 65 mesh. If the carbon and the metal oxides in the plugs are fully converted, the reaction product weighs about 1000 g.

Figures 3, 4:
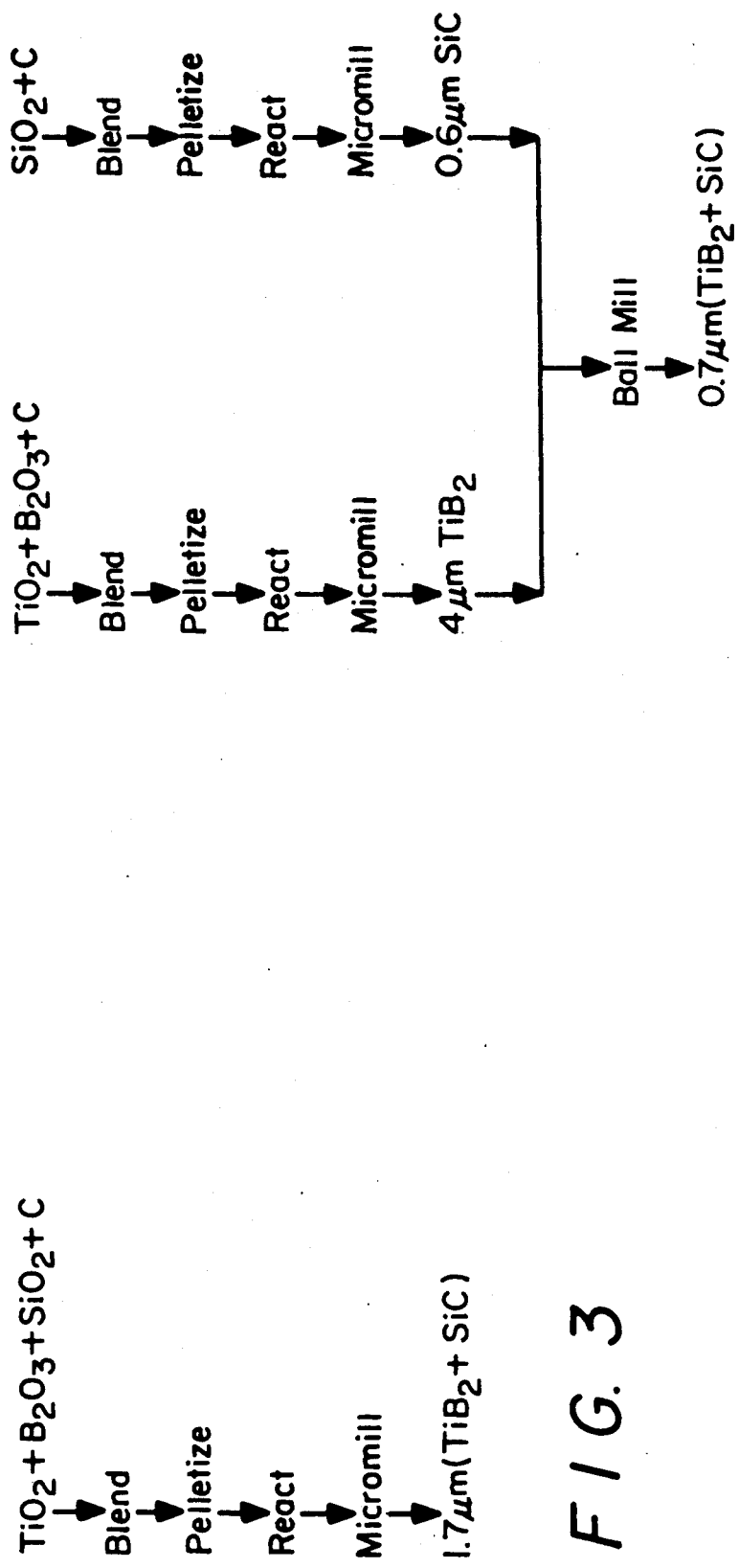
FIG. 3 is a flow-chart illustrating a method of the invention for forming an alloyed powder of titanium diboride and silicon carbide.
FIG. 4 is a flow-chart illustrating a prior method for forming a mixed powder of titanium diboride and silicon carbide.

FIG. 3 is a flow-chart summarizing the above described process for producing alloyed $TiB_2$ and SiC powders. FIG. 4 illustrates a comparable prior-art process for forming a mixed powder. By comparing the processes of FIGS. 3 and 4, the significant reduction in process steps provided by practice of the invention is clearly seen.

EXAMPLE IV

This example illustrates production of an titanium diboride powder containing an iron sintering aid according to the method of the invention. A blend of metal oxides and carbon is prepared by mixing 2 grams $Fe_2O_3$, 368 g $TiO_2$, 353 g $B_2O_3$, and 277 g carbon (Thermax) in a v-blender for 15 minutes. The blended material is pressed at room temperature and a pressure of 30,000 psi to form plugs about 1 inch in diameter and 1.5 inches long. Each plug weighs approximately 23 g with a density of about 1.2 g/cm$^3$ The plugs are placed into a graphite capsule with an inside diameter of about 3.5 inches, and about 12 inches long. The capsules containing the plugs are placed into a 4 inch inside diameter resistance heated furnace. After purging the furnace with argon for one hour, the power to the furnace is turned on, and the capsule is heated at a rate of 300° C./hour to a temperature of 1800° C. The carbothermic reaction is carried out at 1800° C. for one hour while the argon flow rate is maintained at 4 ft$^3$/hr. The power to the furnace is then turned off, and the capsule allowed to cool. After cooling, the reaction product is removed from the capsule, weighed, and micromilled to a particle size less than 65 mesh. If the carbon and the metal oxides in the plugs are fully converted, the plugs weigh 320 g or less.

EXAMPLE V

This example illustrates production of an boron carbide ($B_4C$) containing an chromium diboride as a grain growth inhibitor, and iron boride as a sintering aid, according to the method of the invention. A blend of metal oxides and carbon is prepared by mixing 683.5 g $B_2O_3$, 296.6 g carbon (Thermax), 3.7 g $Fe_2O_3$, and 6.2 g $Cr_2O_3$ in a twin-shell blender for 60 minutes. The blended material is pressed at room temperature and a pressure of 30,000 psi to form plugs about 1 inch in diameter and 1.5 inches long. Each plug weighs approximately 25 g with a density of about 1.3 g/cm$^3$ The plugs are placed into a graphite capsule with an inside diameter of about 3.5 inches, and about 12 inches long. The capsules containing the plugs are placed into a 4 inch inside diameter resistance heated furnace. After purging the furnace with argon for one hour, the power to the furnace is turned on, and the capsule is heated at a rate of 300° C./hour to a temperature of 1900° C. The carbothermic reaction is carried out at 1900° C. for one hour while the argon flow rate is maintained at 4 ft$^3$/hr. The power to the furnace is then turned off, and the capsule allowed to cool. After cooling, the reaction product is removed from the capsule, weighed, and micromilled to a particle size less than 65 mesh. If the carbon and the metal oxides in the plugs are fully converted, the plugs weigh 200 g, or less.

EXAMPLE VI

A sample of $TiB_2$ powder with a iron sintering aid was made according to the method of invention described above in Example IV. The properties of the powder are summarized below in Table A. For comparison, shown also in Table A are the properties of the following powders;
  (1) a pure as-produced TiB₂ powder without any sintering additives,
  (2) as-produced TiB₂ powder after ball-milling with stainless steel balls for 2 hours,
  (3) as-produced TiB₂ powder after ball-milling for 2 hours in stainless steel mill with tungsten carbide balls containing 6 wt. % cobalt,
  (4) as-produced TiB₂ powder after ball-milling for 1 hour in stainless steel mill with tungsten carbide balls containing 12 wt. % cobalt,
  (5) as-produced TiB₂ powder after dry-blending with 1 wt. % iron for 30 minutes.

Each powder was hot-pressed at a temperature of 1950° C., under 2500 psi, for a period of 2 hours. The density of the resulting refractory molded shape is also shown in Table A.

As seen by the data in Table A, the sintered shape of the powder of the invention is generally superior to the comparative shapes. The sintered shape from the comparative pure as-produced powder (1) had significantly inferior density due to the absence of a sintering aid. The shapes from comparative ball-milled powders (2, 3 & 4) have satisfactory properties, but the amount of the iron and/or cobalt sintering aids in the powder could not be controlled, and as compared to the invention, an excess of sintering aid was unavoidably introduce into the sintered shape. In addition, these comparative powders generally require more sintering aid than the invention to compensate for a poorer distribution of sintering aid in the powder. In addition, the comparative powders that were ball-milled with tungsten carbide balls containing cobalt (3 & 4) were unavoidably contaminated with tungsten. The comparative sample, wherein iron was blended into the powder (5), required an excess of iron, as compared to the invention, to compensate for the poorer distribution of iron through the powder. The poorer distribution was due largely to a settling effect wherein the heavier iron particles separate and settle out from the mixture. The tungsten contaminant in 3 & 4, and the iron contaminant in 5, both of which are dense materials, also resulted in higher density than the shapes without contaminant. Although higher densities for sintered shapes often imply increase strength of the sintered shape, the density increase caused by dense impurities generally does not reflect such improved properties.

EXAMPLE VII

A sample of B₄C powder with a chromium diboride grain growth inhibitor and sintering aid was made according to the method of invention described above in Example V. The properties of the powder are summarized below in Table B. For comparison, also shown in Table B are the properties of the following powders;
  (1) a pure as-produced B₄C powder without any sintering additives,
  (2) as-produced powder B₄C after ball-milling with stainless steel balls for 3 hours,
  (3) as-produced B₄C powder after ball milling for 1 hour in stainless steel mill with tungsten carbide balls containing 6 wt. % cobalt, Each powder was hot-pressed at a temperature of 2200° C., under 2500 psi, for a period of 2 hours. The density of the resulting refractory molded shape is also shown in Table B.

As seen by the data in Table B, the sintering aid in the powder of the invention, produced a denser ceramic product, which generally adds to the strength of the ceramic. Comparative samples 2 and 3 showed improved density. However, this was at the cost of significant amounts of impurities, particularly iron and tungsten. The densities of samples 2 and 3, are greater than the invention, however, it should be noted that the presence of dense tungsten and iron impurities contributes to these densities, and therefore, these increased density values do not necessarily imply a stronger ceramic.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

TABLE A

Titanium Diboride Powders with Iron Sintering Aid

|  | Comparative | | | | | Invention |
|---|---|---|---|---|---|---|
|  | (1) | (2) | (3) | (4) | (5) |  |
| Carbon (wt. %) | 0.66 | 0.54 | 0.66 | 0.73 | 0.65 | 0.46 |
| Oxygen (wt. %) | 0.26 | 0.50 | 0.86 | 0.52 | 0.26 | 0.46 |
| Nitrogen (wt. %) | 0.08 | 0.05 | 0.10 | 0.05 | 0.08 | 0.10 |
| Titanium (wt. %) | 67.7 | 67.2 | 67.0 | 66.3 | 67.0 | 68.5 |
| Boron (wt. %) | 30.6 | 30.2 | 30.0 | 29.4 | 30.3 | 30.1 |
| Ti + B (wt. %) | 98.3 | 97.4 | 97.0 | 97.0 | 97.3 | 98.6 |
| Ti/B | 2.212 | 2.225 | 2.233 | 2.255 | 2.211 | 2.276 |
| Iron (wt. %) | — | 0.451 | 0.13 | 0.07 | 1.0 | 0.25 |
| Tungsten (wt. %) | — | — | 1.14 | 1.36 | — | — |
| Cobalt (wt. %) | — | — | 0.08 | 0.21 | — | — |
| Ave. Particle Size (m × 10⁻⁶) | 4.4 | 3.3 | 2.6 | 4.0 | 4.4 | 5.0 |
| Surface Area (m²/g) | 0.43 | 0.98 | 1.94 | 1.19 | 0.43 | 0.37 |
| Hot-Pressed Density (g/cm³) | 3.24 | 4.48 | 4.44 | 4.54 | 4.41 | 4.40 |

TABLE B

Boron Carbide Powders with CrB₂ Sintering Aid

|  | Comparative | | | Invention |
|---|---|---|---|---|
|  | (1) | (2) | (3) |  |
| Oxygen (wt. %) | 2.22 | 0.93 | 1.24 | 0.65 |
| Nitrogen (wt. %) | 1.92 | 1.91 | 1.92 | 2.25 |
| Carbon (wt. %) | 19.7 | 15.4 | 20.1 | 21.4 |
| Boron (wt. %) | 74.8 |  | 73.9 | 72.5 |
| B + C (wt. %) | 94.5 |  | 94.0 | 93.9 |
| B/C | 3.8 |  | 3.68 | 3.39 |
| Chromium (wt. %) | — | — | — | 1.69 |
| Iron (wt. %) | — | 0.30 | 0.13 | 0.23 |

TABLE B-continued

| Boron Carbide Powders with CrB$_2$ Sintering Aid | | | | |
|---|---|---|---|---|
| | Comparative | | | |
| | (1) | (2) | (3) | Invention |
| Tungsten (wt. %) | — | — | 0.90 | — |
| Cobalt (wt. %) | — | — | 0.05 | — |
| Ave. Particle Size (m × 10$^{-6}$) | 13.0 | 7.7 | 5.1 | 6.2 |
| Surface Area (m$^2$/g) | 0.69 | 0.73 | 0.78 | 1.24 |
| Hot-Pressed Density (g/cm$^3$) | 2.10 | 2.49 | 2.53 | 2.46 |

What is claimed is:

1. A method for preparing an alloyed refractory powder composed of a multiplicity of individual particles each of which consists essentially of an alloy of two or more carbothermic reaction products of elemental oxides and carbon, which method comprises:
   (a) blending carbon with at least a first and second elemental oxide each of which is selected from a separate oxide of the group of elements consisting of: boron, titanium, zirconium, chromium, molybdenum, tungsten, niobium, tantalum, iron, nickel, cobalt, vanadium, hafnium, silicon, uranium and thorium;
   (b) heating the blend from step (a) to a temperature sufficient to form a carbothermic reaction mixture composed of a first and second reaction product of said first and second elemental oxide and carbon with said first and second reaction product forming an alloy; and
   (c) comminuting the alloy of step (b) to form a powder of individual alloyed particles.

2. The method of claim 1 wherein the first reaction product is a refractory compound selected from the group consisting of the carbides and borides of titanium, zirconium, chromium, molybdenum, tungsten, niobium, tantalum, vanadium, hafnium, uranium, and chromium.

3. The method of claim 1 wherein the second reaction product is selected from the group consisting of boron carbide, silicon carbide and the carbides and borides of titanium, zirconium, chromium, molybdenum, tungsten, niobium, tantalum, iron, nickel, cobalt, vanadium, hafnium, uranium, and thorium.

4. The method of claim 1 wherein one of said reaction products is a sintering aid.

5. The method of claim 6 wherein the sintering aid is selected form the group consisting of chromium diboride, iron boride, nickel boride, cobalt boride, zirconium carbide, boron carbide, silicon tetraboride, and silicon hexaboride.

6. The method of claim 2 comprising a first metal oxide of WO$_3$ and a second metal oxide of Co$_3$O$_4$ such that the first refractory compound is WC, and the second reaction product is Co.

7. The method of claim 1 comprising a first metal oxide of TiO$_2$ and a second metal oxide of SiO$_2$, such that the first refractory compound is TiB$_2$, and the second reaction product is SiC.

8. The method of claim 1 comprising a first metal oxide of TiO$_2$ and a second metal oxide selected from the group comprising Fe$_2$O$_3$, Co$_3$O$_4$, NiO, WO$_3$, and mixtures thereof, such that the first refractory compound is TiB$_2$, and the reaction product of the second metal oxide is selected from the group consisting of FeB, CoB, NiB, WB, and mixtures thereof.

9. A refractory powder comprising individual particles with each particle consisting essentially of an alloy of borides or of borides and carbides formed from at least two carbonaceous reaction products of elemental oxides and carbon wherein the first of said two reaction products is a refractory compound selected from the group consisting of boron cabide, silicon carbide and the carbides and borides of the transition metals and wherein the second of said two reaction products is a refractory compound selected from the group consisting of the carbides and borides of titanium, zirconium, chromium, molybdenum, tungsten, niobium, tantalu, anadium, hafnium, uranium, and chromium.

10. The powder of claim 9 wherein the second of said two reaction products is selected from the group consisting of chromium diboride, iron boride, nickel boride, cobalt boride, zirconium carbide, boron carbide, silicon tetraboride, and silicon hexaboride.

11. The powder of claim 9 wherein the first of said two reaction products is TiB$_2$, and wherein the second reaction product is selected from the group consisting of FeB, CoB, NiB, WB, and mixtures thereof.

* * * * *

UNITED STATES PATENT AND TRADEMARK OFFICE
CERTIFICATE OF CORRECTION

PATENT NO. : 5,047,372

DATED : September 10, 1991

INVENTOR(S) : Lien N. Parrish, Lionel C. Montgomery

It is certified that error appears in the above-identified patent and that said Letters Patent is hereby corrected as shown below:

On the title page, item [75] Inventors:
"Lien Parrish" should be --Lien N. Parrish--.

Column 4, line 15, "tempera" should read --temperatures.--.

Column 4, line 26, after the word "is", delete "a".

Column 5, line 21, "The" should read --This--.

Column 6, lines 12, 39 and 49, "an" should read --a--.

Column 6, line 67, "a" should read --an--.

Column 10,
Claim 5, line 3, "6" should read --4--; line 4, "form" should read --from--.

Column 10,
Claim 9, line 29, "cabide" should read --carbide--; line 34, "tantalu" should read --tantalum--; line 35, "anadium" should read --vanadium--.

Signed and Sealed this

Twenty-sixth Day of October, 1993

Attest:

BRUCE LEHMAN

Attesting Officer

Commissioner of Patents and Trademarks